(12) United States Patent
Liu et al.

(10) Patent No.: US 11,520,430 B2
(45) Date of Patent: Dec. 6, 2022

(54) TOUCH SIGNAL PROCESSING METHOD AND RELATED TOUCH DEVICE

(71) Applicant: HIMAX TECHNOLOGIES LIMITED, Tainan (TW)

(72) Inventors: Li-Lin Liu, Tainan (TW); Chun-Jen Su, Tainan (TW); Wen-Sen Su, Tainan (TW); Yen-Hsiang Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/161,681

(22) Filed: Jan. 29, 2021

(65) Prior Publication Data

US 2022/0244804 A1    Aug. 4, 2022

(51) Int. Cl.
*G06F 3/041* (2006.01)

(52) U.S. Cl.
CPC .................................. *G06F 3/0416* (2013.01)

(58) Field of Classification Search
None
See application file for complete search history.

(56) References Cited

U.S. PATENT DOCUMENTS

| | | |
|---|---|---|
| 2011/0050635 A1 | 3/2011 | Nien |
| 2012/0062475 A1* | 3/2012 | Locker ................. G06F 3/0416 345/1.3 |
| 2012/0169615 A1 | 7/2012 | Chang |
| 2014/0232691 A1* | 8/2014 | Lee ....................... G06F 3/0446 345/174 |
| 2016/0202797 A1 | 7/2016 | Cordeiro |
| 2020/0110493 A1* | 4/2020 | Ron ....................... G06F 3/0412 |

FOREIGN PATENT DOCUMENTS

| | | |
|---|---|---|
| CN | 110362259 A | 10/2019 |
| CN | 110489002 A | 11/2019 |
| CN | 111580601 A | 8/2020 |
| JP | 2011-48610 A | 3/2011 |
| JP | 2015-90706 A | 5/2015 |

(Continued)

OTHER PUBLICATIONS

Yi Li et al., Research of Parallel Data Processing, Anti-light Interference Infrared Touch Technology, 2012 IEEE fifth International Conference on Advanced Computational Intelligence (ICACI), Oct. 18-20, 2012, pp. 983-987, Nanjing, Jiangsu, China, XP032331347.

*Primary Examiner* — Stephen T. Reed
(74) *Attorney, Agent, or Firm* — Winston Hsu (57) ABSTRACT

A touch signal processing method, for a touch display integrated device including a plurality of touch display units, is provided. Each of the plurality of touch display units includes a touch microcontroller unit (MCU). The touch signal processing method includes sensing, by a sensing module of each of the plurality of touch display units, a physical area corresponding to each of the plurality of touch display units to generate a plurality of sensing raw data; passing, by an (n−1)-th touch MCU of the plurality of touch display units, a plurality of overlap sensing raw data corresponding to an overlap area of the physical area to an n-th touch MCU; and determining, by each of the touch MCU of the plurality of touch display units, a coordinate information corresponding to a touch location of a processing area.

14 Claims, 8 Drawing Sheets

(56) References Cited

FOREIGN PATENT DOCUMENTS

| | | |
|---|---|---|
| JP | 2015-194983 A | 11/2015 |
| JP | 2015-194987 A | 11/2015 |
| JP | 2018-5681 A | 1/2018 |
| KR | 10-1837713 B1 | 3/2018 |
| TW | 201546671 A | 12/2015 |

* cited by examiner

TOUCH SIGNAL PROCESSING METHOD AND RELATED TOUCH DEVICE

BACKGROUND OF THE INVENTION

1. Field of the Invention

The present invention relates to a touch signal processing method and a related touch device, and more particularly, to a touch signal processing method and a related touch display integrated device capable of effectively processing the touch signal of the touch display integrated device.

2. Description of the Prior Art

The conventional capacitive touch devices are widely utilized and developed from small touch devices to large touch devices. The large touch devices may be applied in, for example, a laptop, a car or a television. In applications of the small touch devices, a single microcontroller unit (MCU) is utilized for processing touch algorithms. However, when the large touch devices, which are composed of a plurality of small touch devices, are processed by a single MCU, higher processing speed, computation ability and more memory resources are needed for the single MCU. In other words, algorithm and computation loadings of the touch devices are centralized on the single MCU.

Therefore, it is necessary to effectively process the touch signals of the large touch device.

SUMMARY OF THE INVENTION

Therefore, the present invention provides a touch signal processing method and a related touch display integrated device, which proposes a distributed processing method and structure to effectively process touch signals of the touch display integrated device.

The present invention discloses a touch signal processing method, for a touch display integrated device including a plurality of touch display units, wherein the plurality of touch display units are concatenated and each of the plurality of touch display units comprises a touch microcontroller unit (MCU), the touch signal processing method includes sensing, by a sensing module of each of the plurality of touch display units, a physical area corresponding to each of the plurality of touch display units to generate a plurality of sensing raw data; receiving, by each of the touch MCU of the plurality of touch display units, the plurality of sensing raw data; passing, by an (n−1)-th touch MCU of the plurality of touch display units, a plurality of overlap sensing raw data corresponding to an overlap area of the physical area to an n-th touch MCU; and determining, by each of the touch MCU of the plurality of touch display units, a coordinate information corresponding to a touch location of a processing area according to the plurality of sensing raw data corresponding to the physical area and the plurality of overlap sensing raw data corresponding to the overlap area.

Another embodiment of the present invention discloses a touch display integrated device comprises a plurality of touch display units, wherein the plurality of touch display units are concatenated and each of the plurality of touch display units comprises a sensing module, configured to sense a physical area corresponding to each of the plurality of touch display units to generate a plurality of sensing raw data; a touch microcontroller unit (MCU), configured to receive the plurality of sensing raw data and determine a coordinate information corresponding to a touch location of a processing area according to the plurality of sensing raw data corresponding to the physical area and a plurality of overlap sensing raw data corresponding to an overlap area; wherein the plurality of overlap sensing raw data corresponding to the overlap area of the physical area are passed by an (n−1)-th touch MCU of the plurality of touch display units to an n-th touch MCU.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
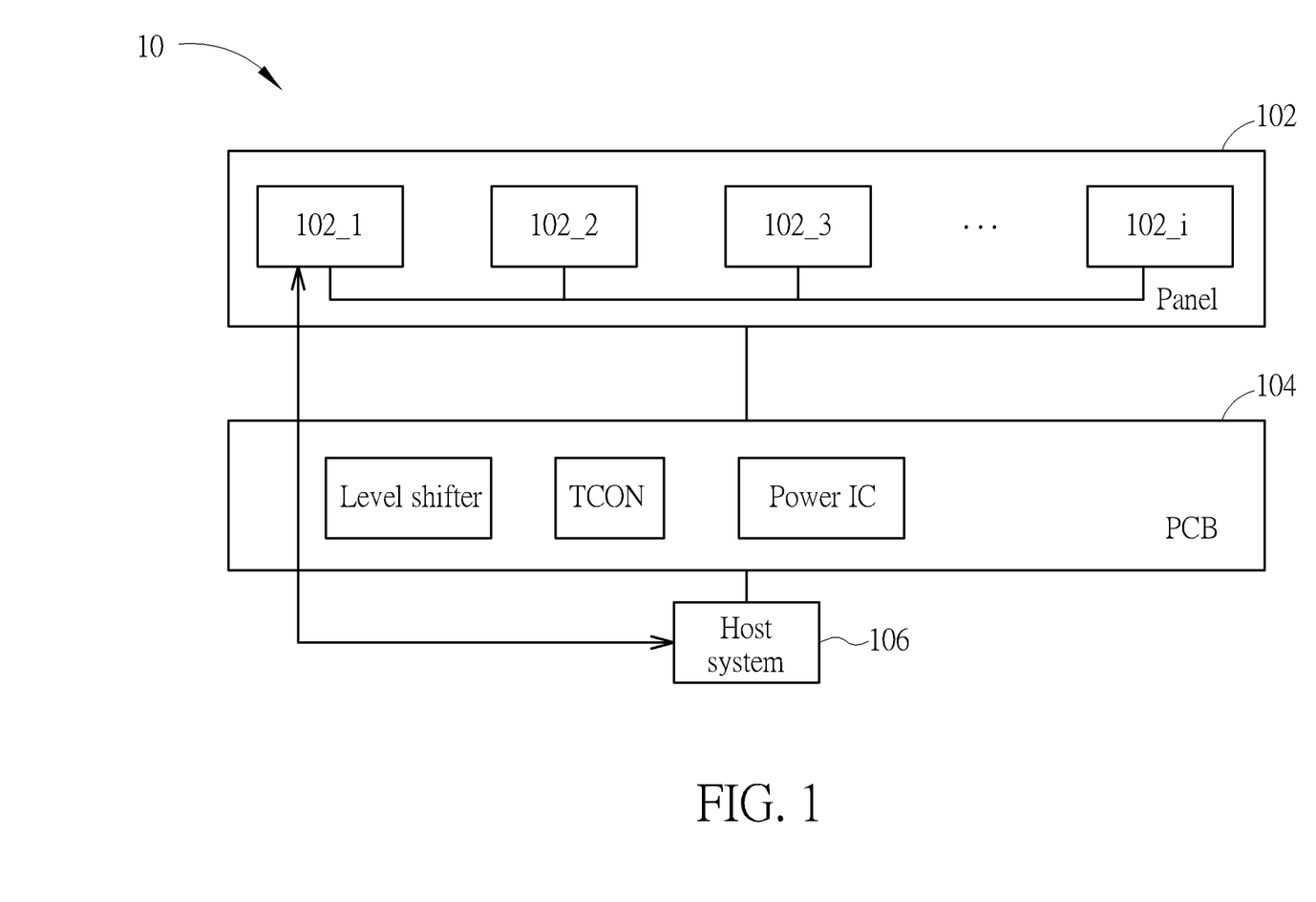
FIG. 1 is a schematic diagram of a large touch display integrated (LTDI) device according to an embodiment of the present invention.

Please refer to FIG. 1, which is a large touch display integrated (LTDI) device 10 according to an embodiment of the present invention. The LTDI device 10 includes a panel 102, a printed circuit board (PCB) 104 and a host system 106. The PCB 104 may include a level shifter, a timing controller (TCON) and a power IC for controlling the panel 102, but not limited thereto. The panel 102 may be an in-cell liquid-crystal display (LCD) panel, which includes a plurality of touch display units 102_0-102_$i$, wherein the touch display units 102_0-102_$i$ are concatenated for sensing and display. Each of the touch display units 102_0-102_$i$ may include a sensing module, a touch analog front end (AFE) and a touch microcontroller unit (MCU). The sensing module is configured to sense a physical area corresponding to each of the touch display units to generate a plurality of sensing raw data. The touch MCU is configured to receive the sensing raw data and determine a coordinate information corresponding to a touch location of a processing area according to the sensing raw data corresponding to the physical area and a plurality of overlap sensing raw data corresponding to an overlap area. The touch MCU of each of the touch display units 102_0-102_$i$ is configured to collect and process the sensing raw data to determine the coordinate information of the touch location and then transmit the coordinate information to a master touch display unit. In the embodiment of FIG. 1, the touch display unit 102_0 is the master touch display unit having a master touch MCU. Notably, the master touch MCU of the master touch display unit according to an embodiment of the present invention may collect the coordinate information from other touch display units and process junctions between the touch MCUs of the touch display units $102\_0$-$102\_i$.

Figure 2:
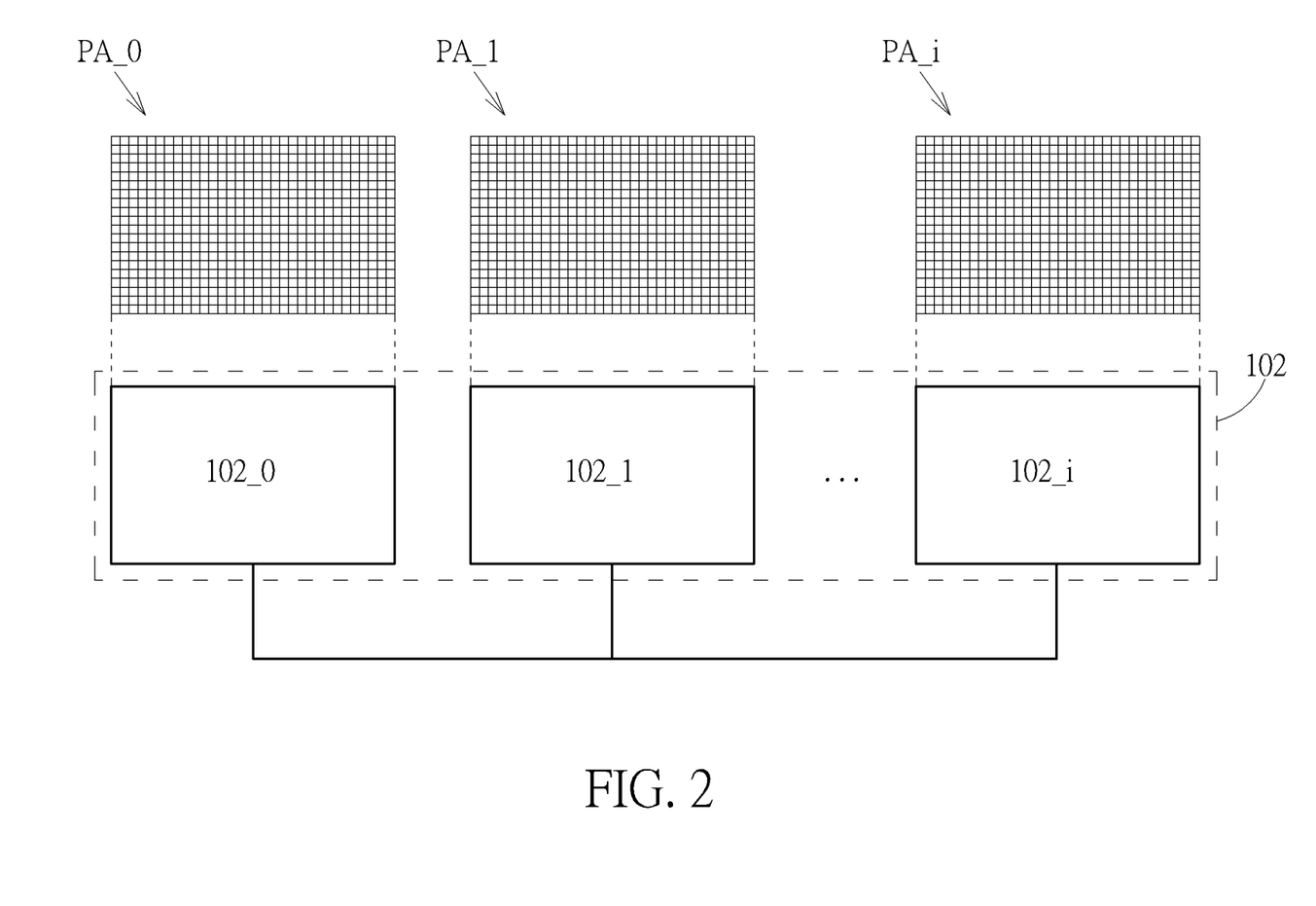
FIG. 2 is a schematic diagram of mapping of a plurality of touch display units and a plurality of physical areas according to an embodiment of the present invention.

In detail, please refer to FIG. 2, which is a schematic of mapping of the touch display units $102\_0$-$102\_i$ and corresponding physical areas $PA\_0$-$PA\_i$ according to an embodiment of the present invention. In FIG. 2, the panel 102 includes a row of touch display units $102\_0$-$102\_i$, which may be respectively corresponded to the physical areas $PA\_0$-$PA\_i$. In other words, the physical areas $PA\_0$-$PA\_i$ may correspond to the panel 102 of the LTDI device 10. In addition, the touch display units $102\_1$-$102\_i$ are concatenated and connected to the master touch unit $102\_0$ via serial peripheral interface (SPI). As such, the master touch unit $102\_0$ may collect the coordinate information from other touch display units $102\_1$-$102\_i$, process junctions between the touch MCUs of the touch display units $102\_0$-$102\_i$ and transmit the processed touch information to the host system 106.

Figure 3:
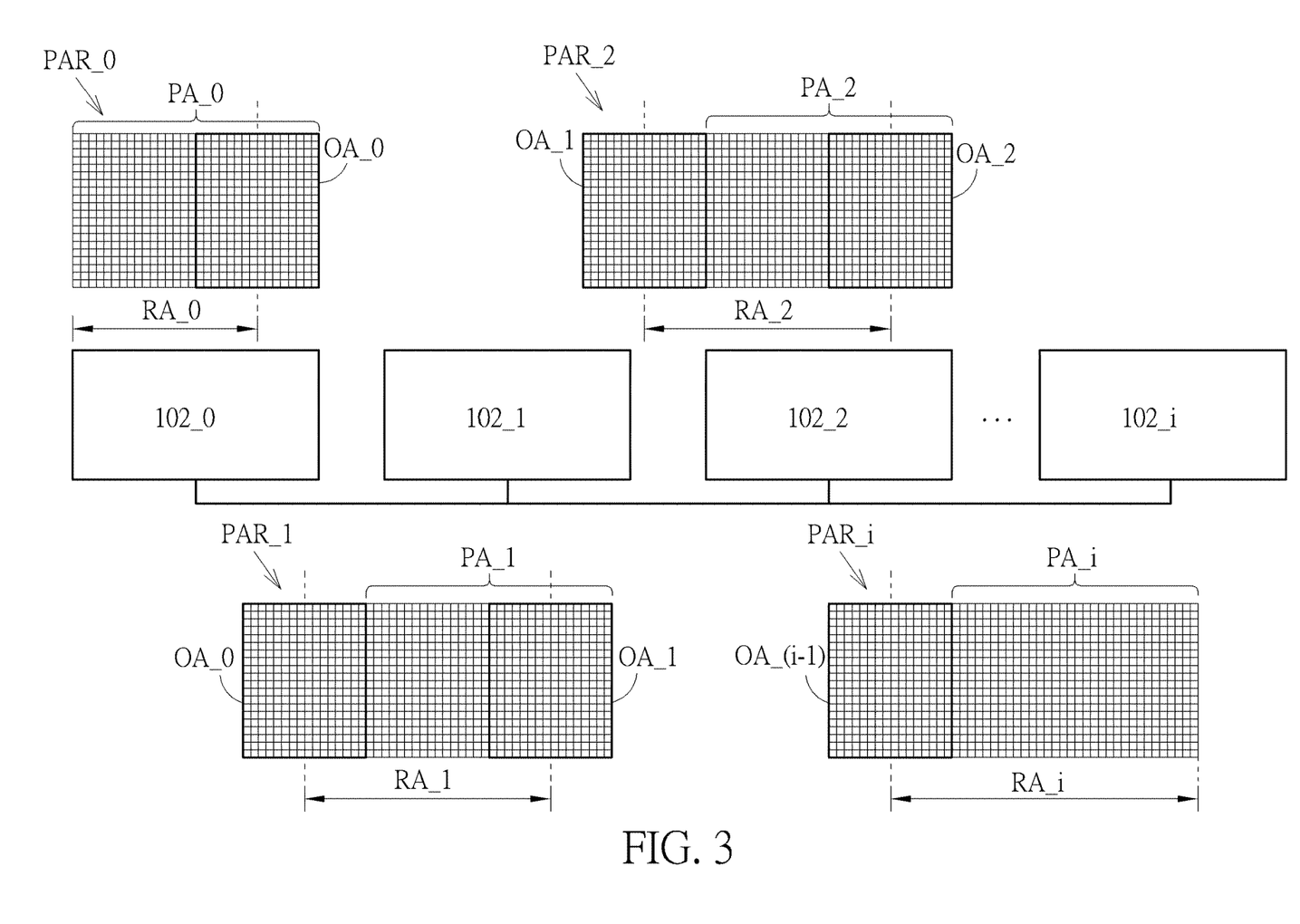
FIG. 3 is a schematic diagram of a processing area of each of the touch display units according to an embodiment of the present invention.

FIG. 3 is a schematic diagram of the processing area of each of the touch display units $102\_0$-$102\_i$ according to an embodiment of the present invention. As shown in FIG. 3, a processing area $PAR\_0$ of the master touch display unit $102\_0$ is identical to the physical area of the master touch display unit $102\_0$, which includes an overlap area $OA\_0$. The sensing raw data corresponding to the overlap area $OA\_0$ are transmitted to the touch MCU of the touch display unit $102\_1$. A processing area $PAR\_1$ of the touch display unit $102\_1$ includes an overlap area $OA\_0$ and the physical area $PA\_1$, and the physical area $PA\_1$ includes an overlap area $OA\_1$. The sensing raw data corresponding to the overlap area $OA\_1$ are transmitted to the touch MCU of the touch display unit $102\_2$. Similarly, a processing area $PAR\_2$ of the touch display unit $102\_2$ includes an overlap area $OA\_1$ and the physical area $PA\_2$, wherein the physical area $PA\_2$ includes an overlap area $OA\_2$. The sensing raw data corresponding to the overlap area $OA\_2$ are transmitted to the touch MCU of the touch display unit $102\_3$. Therefore, the overlap sensing raw data corresponding to the overlap area of the physical area are passed by an $(n-1)$-th touch MCU to an n-th touch MCU. In other words, each of the touch MCU of the touch display units $102\_0$-$102\_i$ receives the sensing raw data corresponding to the physical area from the sensing module and transmits the overlap area to the following touch MCU at the same time.

Then, each of the touch MCU of the touch display units $102\_0$-$102\_i$ is configured to determine the coordinate information corresponding to a touch location of corresponding processing area. In detail, when the touch location is located in a reporting area of the corresponding touch display unit, the corresponding touch MCU is configured to report the coordinate information corresponding to the touch location within the reporting area to the master touch MCU of the master touch display unit $102\_0$. In an embodiment, the reporting area of the n-th touch MCU is composed of a part of the overlap area of the $(n-1)$-th touch MCU and a part of the overlap area of an $(n+1)$-th touch MCU. For example, as shown in FIG. 3, a reporting area $RA\_1$ of the touch MCU of the touch display unit $102\_1$ is composed of half of the overlap area $OA\_0$ and half of the overlap area $OA\_1$. Similarly, a reporting area $RA\_2$ of the touch MCU of the touch display unit $102\_2$ is composed of half of the overlap area $OA\_1$ and half of the overlap area $OA\_2$. Notably, the sensing data of the overlap area $OA\_0$ are passed to the touch MCU of the touch display unit $102\_1$ for determining the touch information to offload loading of the master touch MCU, such that a reporting area $RA\_0$ of the master touch MCU of the touch display unit $102\_0$ is only composed of the physical area $PA\_0$ without the overlap area $OA\_0$.

In order to determine the touch information, each of the touch MCU of the touch display units $102\_0$-$102\_i$ is configured to determine at least an effective block of the processing area and cluster the at least an effective block of the processing area to distinguish the touch on the panel 102, wherein the block may be one or more pixels of the touch display unit. Then, for each cluster, a center coordinate of gravity of each cluster of the at least an effective block is determined.

When the center coordinate of gravity of each cluster belongs to the reporting area of corresponding processing area, the center coordinate of gravity of each cluster is reported to the master touch MCU of the master touch display unit $102\_0$. As such, the master touch MCU of the master touch display unit $102\_0$ is configured to arrange the coordinate information corresponding to the touch location from each of the touch MCU of the touch display units $102\_1$-$102\_i$ and inform the host system 106 of the LTDI device 10 to collect the touch locations.

Notably, since the reporting areas of the touch display units $102\_0$-$102\_i$ do not overlap with each other, repetition of reporting the coordinates of the touch is avoided. In addition, the overlap area of the touch display unit $102\_0$-$102\_i$ is not necessarily to be half of the physical area, the overlap area smaller than or equal to half of the physical area is applicable to the present invention. Therefore, the reporting area corresponding to each of the touch display unit $102\_0$-$102\_i$ is smaller than or equal to the processing area corresponding to each of the touch display unit $102\_0$-$102\_i$. As such, the overlap area pressed by a finger touch may be sensed accordingly.

Figure 4:
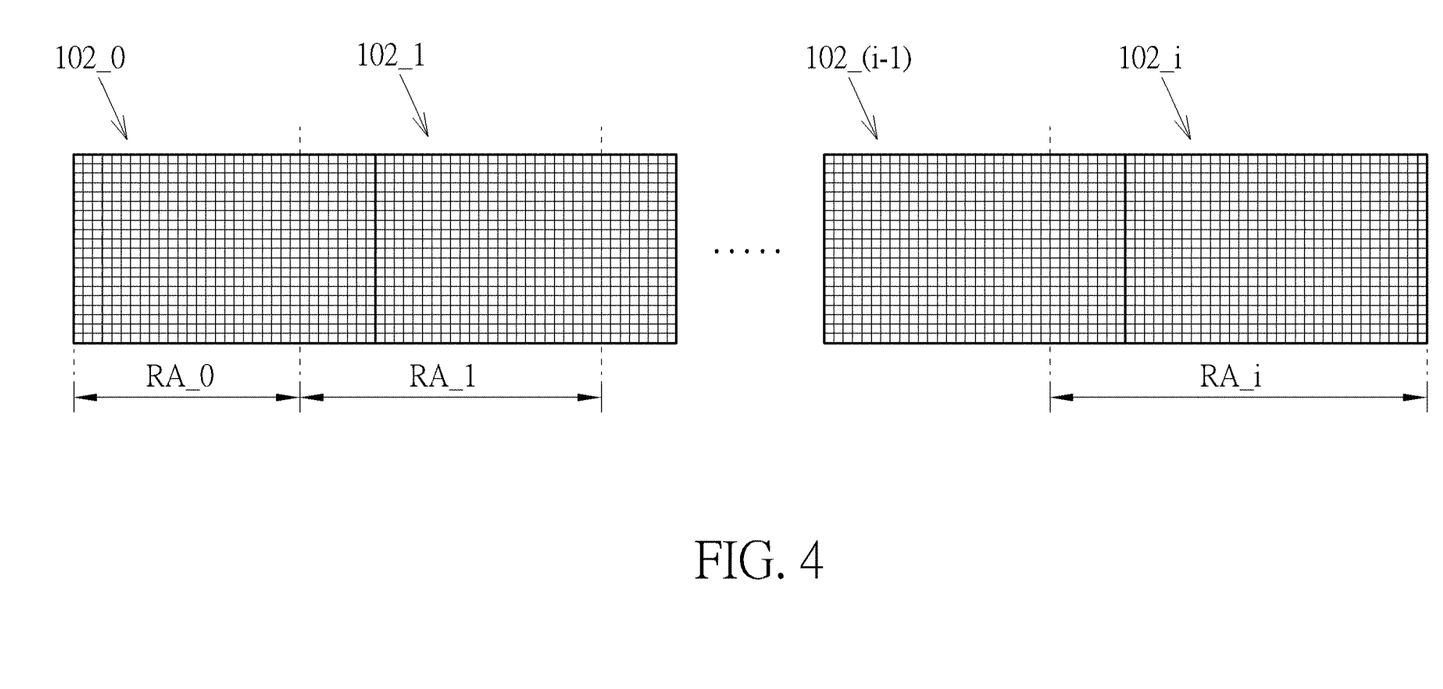
FIG. 4 is a schematic diagram of a resolution of the LTDI device according to an embodiment of the present invention.

In an embodiment, assume that channels of each touch display unit are 32*20 with a resolution of 1920*1080 as shown in FIG. 4. For the master touch MCU of the master touch display unit $102\_0$, the reporting area $RA\_0$ corresponding to the master touch display unit $102\_0$ is 0 to (1920−480) in x-axis direction, and 0-1080 in y-axis direction. For the touch MCU of the touch display unit $102\_1$, the reporting area $RA\_1$ corresponding to the touch display unit $102\_1$ is −480 to (1920−480) in x-axis direction, and 0-1080 in y-axis direction. For the touch MCU of the touch display unit $102\_i$, the reporting area $RA\_i$ corresponding to the touch display unit $102\_i$ is −480 to 1920 in x-axis direction, and 0-1080 in y-axis direction.

In an embodiment, a horizontal width of the overlap area of the physical area is larger than a diameter of a maximal supportable touch area. When a touch area is larger than the overlap area, the touch MCU of the touch display units $102\_0$-$102\_i$ is configured not to report the coordinate information corresponding to the touch location. Assume that a sensor pitch of the panel is 4 millimeter (mm), a horizontal width (i.e. in y-axis direction) of the overlap area of the physical area is 32 mm. In other words, when sensing values of more than 8 consecutive channels (i.e. a cluster) of the panel 102 are higher than a sensing threshold, the cluster may be seen as a partial palm and is not reported to the master touch MCU of the master display unit $102\_0$. That is, when the touch area is larger than the overlap area, the junction between two concatenated touch display units may sense the touch information, regard the touch information as the partial palm and not report the sensing raw data to the master touch MCU.

In another embodiment, when the touch area of the cluster is smaller than 8 consecutive channels, i.e. the touch area is smaller than the overlap area, the complete touch area may be detected by one touch MCU of the touch display unit and be reported to the master touch MCU.

Figure 5:
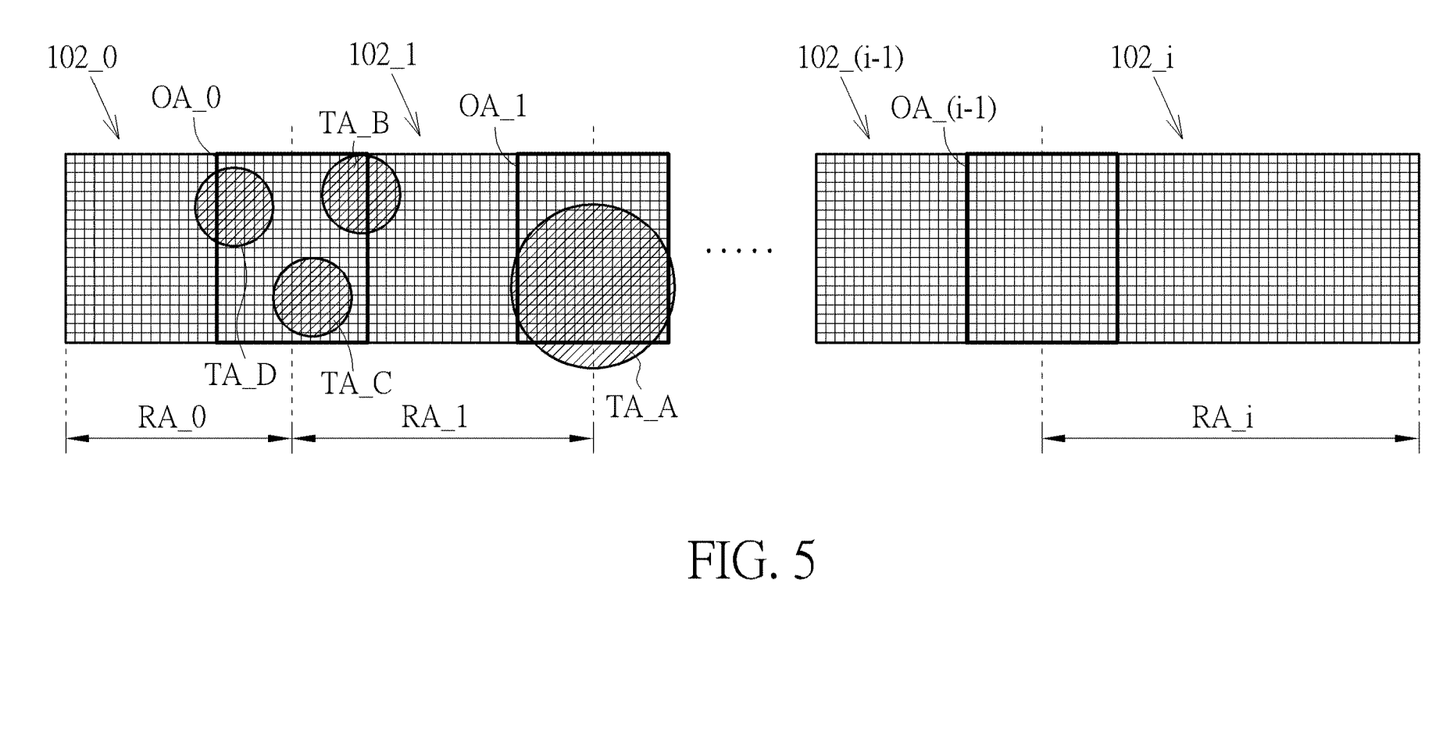
FIG. 5 is a schematic diagram of touch examples on the LTDI device according to an embodiment of the present invention.

FIG. 5 is a schematic diagram of touch examples on the LTDI device 10 according to an embodiment of the present invention. A touch area TA_A of a diameter 66 mm is located on the overlap area OA_1. Since the touch area TA_A is larger than the overlap area OA_1, the touch area TA_A is regarded as the partial palm and is not reported to the master touch MCU of the master touch display unit 102_0. Touch areas TA_B, TA_C of a diameter 32 mm are located on the overlap area OA_0 and is smaller than the overlap area OA_0, the touch areas TA_B, TA_C are reported by the touch MCU of the touch display unit 102_1 since a center coordinate of gravity of the touch areas TA_B, TA_C is located in the processing area PA_1. Touch area TA_D of a diameter 32 mm is located in the overlap area OA_0 and is smaller than the overlap area OA_0, the touch area TA_D is reported by the master touch MCU of the master touch display unit 102_0 since a center coordinate of gravity of the touch areas TA_D is located in the processing area PA_0.

Figure 6:
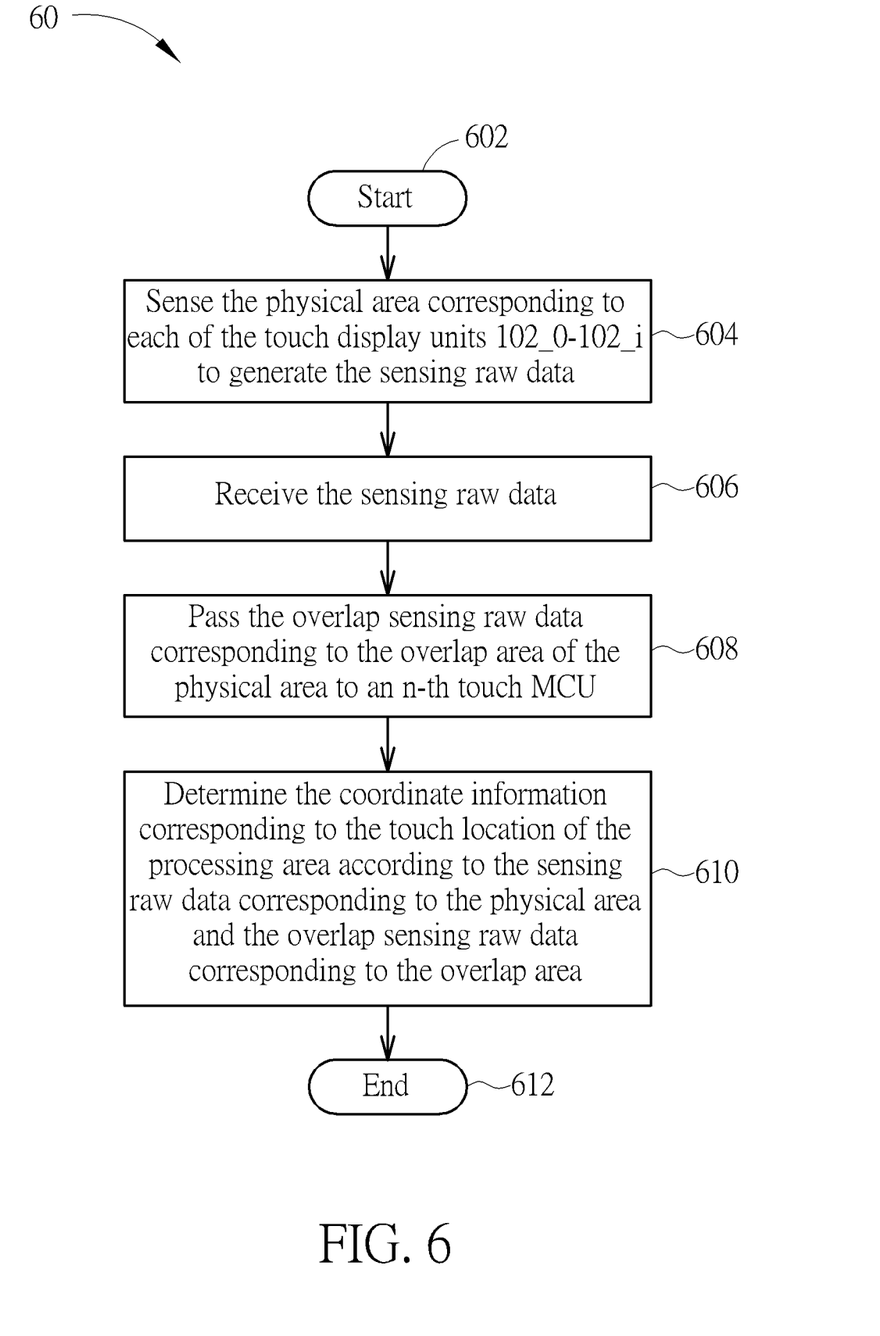
FIG. 6 is a schematic diagram of a touch signal processing process according to an embodiment of the present invention.

An operation method of the LTDI device 10 may be summarized as a touch signal processing process 60 for the setup configuration and shown in FIG. 6. The touch signal processing process 60 for the LTDI device 10 includes the following steps:

Step 602: Start.

Step 604: Sense the physical area corresponding to each of the touch display units 102_0-102_i to generate the sensing raw data.

Step 606: Receive the sensing raw data.

Step 608: Pass the overlap sensing raw data corresponding to the overlap area of the physical area to an n-th touch MCU.

Step 610: Determine the coordinate information corresponding to the touch location of the processing area according to the sensing raw data corresponding to the physical area and the overlap sensing raw data corresponding to the overlap area.

Step 612: End.

Figure 7:
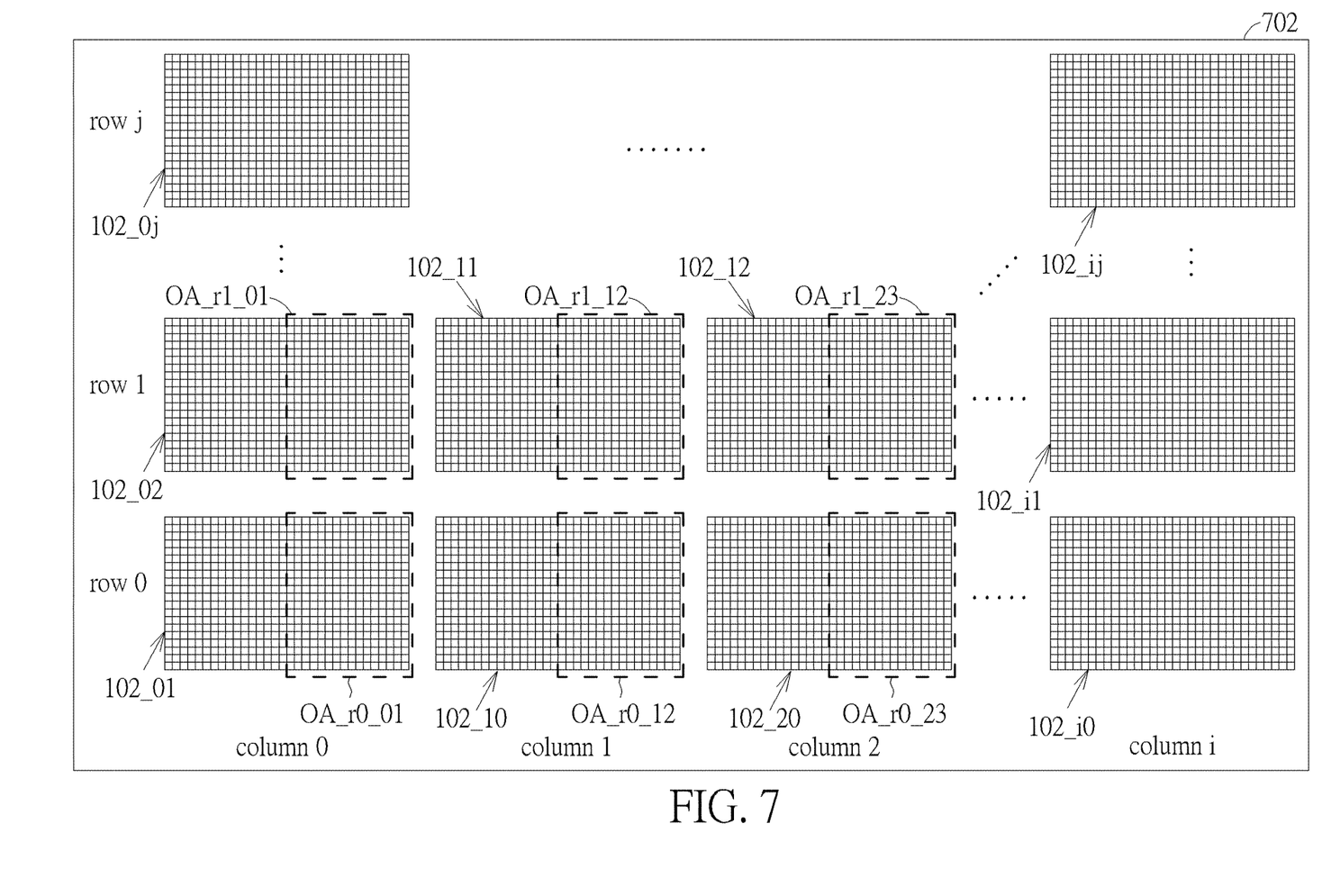
FIGS. 7 and 8 are schematic diagrams of a panel according to another embodiment of the present invention.

The above embodiments illustrate that the panel 102 of the LTDI device 10 includes one row of concatenated touch display units 102_0-102_i. In another embodiment, the panel may include multiple rows of concatenated touch display units. Please refer to FIG. 7, which is a schematic diagram of a panel 702 according to an embodiment of the present invention. The panel 702 is another embodiment of the panel 102, which includes multiple rows 0-i and columns 0-j of concatenated touch display units 102_00-102_ij. As shown in FIG. 7, the row 0 includes the concatenated touch display units 102_00-102_0i, the row_1 includes the concatenated touch display units 102_10-102_1i and the row i includes the concatenated touch display units 102_0j-102_ij, and each of touch display units 102_00-102_ij are connected via the SPI.

Different with the above embodiment, each of rows 0-j of the touch display units 102_00-102_ij of the panel 702 passes the sensing raw data of the overlap area to the following touch display unit in the x-axis direction at a first timing, e.g. the touch display unit 102_10 passes sensing raw data of an overlap area OA_r0_12 to the touch display unit 102_20, and the touch display unit 102_01 passes sensing raw data of an overlap area OA_r1_01 to the touch display unit 102_11.

Figure 8:
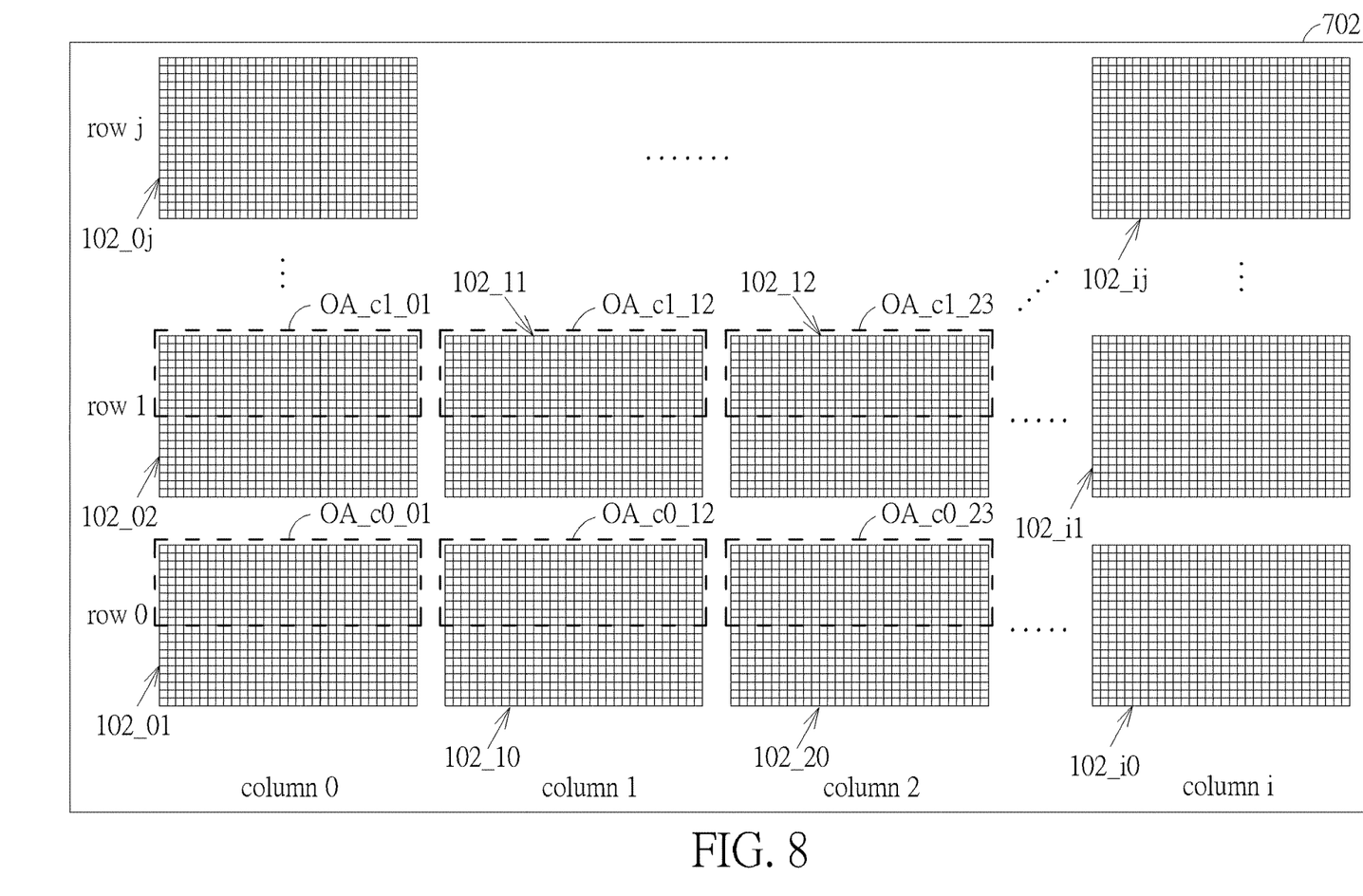

At a second timing, as shown in FIG. 8, each column of the touch display units 102_00-102_ij of the panel 702 passes the sensing raw data of the overlap area to the following touch display unit, e.g. the touch display units 102_00 passes sensing raw data of an overlap area OA_c0_01 to the touch display units 102_01, and the touch display units 102_10 passes sensing raw data of an overlap area OA_c1_01 to the touch display units 102_11. Alternatively, the first timing and the second timing may be identical.

Therefore, each of the touch display units 102_00-102_ij determines the touch location based on its corresponding processing area, and then report the determined center coordinate of gravity of the touch location to a master touch MCU of a master touch display unit 102_00 when the center coordinate of gravity of the touch location belongs to the reporting area of corresponding processing area.

As such, after the master touch MCU of the master touch display unit 102_00 of the panel 702 collects all touch information from the touch display units 102_00-102_ij, the master touch MCU is configured to arrange the coordinate information corresponding to the touch location from touch display units 102_00-102_ij and inform the host system 106 of the LTDI device 10 to collect the touch locations.

Notably, those skilled in the art may properly design the touch signal processing method and the LTDI device according to different requirements, e.g. the overlap area is not limited to half of the physical area of the touch display unit and the master touch display other touch display units, are applicable to the present invention and not limited thereto.

In summary, the present invention provides a touch signal processing method and related LTDI device, which utilizes a distributed structure to evenly offload computational loading on the touch MCU of the touch display units and offloads the loading of the master touch MCU.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch signal processing method, for a touch display integrated device including a plurality of touch display units, wherein the plurality of touch display units are concatenated and each of the plurality of touch display units includes a touch microcontroller unit (MCU), the touch signal processing method comprising:

sensing, by a sensing module of each of the plurality of touch display units, a physical area corresponding to each of the plurality of touch display units to generate a plurality of sensing raw data;

receiving, by each of the touch MCU of the plurality of touch display units, the plurality of sensing raw data;

passing, by an (n−1)-th touch MCU of the plurality of touch display units, a plurality of overlap sensing raw data corresponding to an overlap area of the physical area to an n-th touch MCU; and determining, by each of the touch MCU of the plurality of touch display units, a coordinate information corresponding to a touch location of a processing area according to the plurality of sensing raw data corresponding to the physical area and the plurality of overlap sensing raw data corresponding to the overlap area;

wherein a horizontal width of the overlap area of the physical area is larger than a diameter of a maximal supportable touch area.

2. The touch signal processing method of claim 1, further comprising:

reporting, by each of the touch MCU of the plurality of touch display units, the coordinate information corresponding to the touch location to a master touch MCU of a master touch display unit;

arranging, by the master touch MCU, the coordinate information corresponding to the touch location from each of the touch MCU of the plurality of touch display units; and informing a host system of the touch display integrated device to collect the touch location.

3. The touch signal processing method of claim 1, wherein each of the touch MCU of the plurality of touch display units is configured to report the touch location within a reporting area of the processing area.

4. The touch signal processing method of claim 3, wherein the reporting area of the n-th touch MCU is composed of a part of the overlap area of the (n−1)-th touch MCU and a part of the overlap area of an (n+1)-th touch MCU.

5. The touch signal processing method of claim 3, further comprising:

determining, by each of the touch MCU of the plurality of touch display units, at least an effective block of the processing area;

clustering, by each of the touch MCU of the plurality of touch display units, the at least an effective block of the processing area; and determining, by each of the touch MCU of the plurality of touch display units, a center coordinate of gravity of each cluster of the at least an effective block.

6. The touch signal processing method of claim 5, further comprising:

reporting, by each of the touch MCU of the plurality of touch display units, the center coordinate of gravity of each cluster to the master touch MCU of the master touch display unit when the center coordinate of gravity of each cluster belongs to the reporting area of corresponding processing area.

7. The touch signal processing method of claim 1, wherein when a touch area is larger than the overlap area, the touch MCU of the plurality of touch display units is configured not to report the coordinate information corresponding to the touch location.

8. A touch display integrated device comprising:

a plurality of touch display units, wherein the plurality of touch display units are concatenated and each of the plurality of touch display units comprises:

a sensing module, configured to sense a physical area corresponding to each of the plurality of touch display units to generate a plurality of sensing raw data; and a touch microcontroller unit (MCU), configured to receive the plurality of sensing raw data and determine a coordinate information corresponding to a touch location of a processing area according to the plurality of sensing raw data corresponding to the physical area and a plurality of overlap sensing raw data corresponding to an overlap area;

wherein the plurality of overlap sensing raw data corresponding to the overlap area of the physical area are passed by an (n−1)-th touch MCU of the plurality of touch display units to an n-th touch MCU;

wherein a horizontal width of the overlap area of the physical area is larger than a diameter of a maximal supportable touch area.

9. The touch display integrated device of claim 8, further comprising:

a master touch display unit, concatenated to one of the plurality of touch display unit and the master touch display unit comprises a master touch MCU;

wherein the touch MCU of the plurality of touch display units is configured to report the coordinate information corresponding to the touch location to the master touch MCU of the master touch display unit;

wherein the master touch MCU is configured to arrange the coordinate information corresponding to the touch location from each of the touch MCU of the plurality of touch display units and inform a host system of the touch display integrated device to collect the touch location.

10. The touch display integrated device of claim 8, wherein each of the touch MCU of the plurality of touch display units is configured to report the touch location within a reporting area of the processing area.

11. The touch display integrated device of claim 10, wherein the reporting area of the n-th touch MCU is composed of a part of the overlap area of the (n−1)-th touch MCU and a part of the overlap area of an (n+1)-th touch MCU.

12. The touch display integrated device of claim 10, wherein the touch MCU of the plurality of touch display units is configured to determine at least an effective block of the processing area; cluster the at least an effective block of the processing area; and determine a center coordinate of gravity of each cluster of the at least an effective block.

13. The touch display integrated device of claim 12, wherein the touch MCU of the plurality of touch display units is configured to report the center coordinate of gravity of each cluster to the master touch MCU of the master touch display unit when the center coordinate of gravity of each cluster belongs to the reporting area of corresponding processing area.

14. The touch display integrated device of claim 8, wherein when a touch area is larger than the overlap area, the touch MCU of the plurality of touch display units is configured not to report the coordinate information corresponding to the touch location.

* * * * *